(12) United States Patent
Ebringer et al.

(10) Patent No.: US 7,752,465 B2
(45) Date of Patent: *Jul. 6, 2010

(54) RELIABILITY PLATFORM CONFIGURATION MEASUREMENT, AUTHENTICATION, ATTESTATION AND DISCLOSURE

(75) Inventors: Tim Ebringer, Victoria (AT); Sachiko Yoshihama, Kawasaki (JP); Seiji Munetoh, Kawasaki (JP); Hiroshi Maruyama, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 936 days.

This patent is subject to a terminal disclaimer.

(21) Appl. No.: 11/100,969

(22) Filed: Apr. 7, 2005

(65) Prior Publication Data

US 2005/0229011 A1    Oct. 13, 2005

(30) Foreign Application Priority Data

Apr. 9, 2004    (JP)    .............................. 2004-115003

(51) Int. Cl.
G06F 21/02    (2006.01)
G06F 12/16    (2006.01)
G06F 21/24    (2006.01)

(52) U.S. Cl. ...................... 713/194; 713/193; 713/175; 713/176; 713/169; 713/187

(58) Field of Classification Search ................. 713/194, 713/193, 169, 187, 2, 175
See application file for complete search history.

(56) References Cited

U.S. PATENT DOCUMENTS 7,302,698 B1 * 11/2007 Proudler et al. ................ 726/2
2003/0226031 A1 * 12/2003 Proudler et al. ............. 713/200
2004/0193888 A1 *  9/2004 Wiseman et al. ............ 713/176
2005/0021968 A1 *  1/2005 Zimmer et al. ............. 713/176
2005/0114682 A1 *  5/2005 Zimmer et al. ............. 713/187
2005/0132031 A1 *  6/2005 Sailer et al. ................ 709/223
2005/0216736 A1 *  9/2005 Smith ........................ 713/168
2005/0223221 A1 * 10/2005 Proudler et al. ............. 713/164
2006/0010326 A1 *  1/2006 Bade et al. .................. 713/176
2006/0074600 A1 *  4/2006 Sastry et al. ................ 702/187
2006/0133612 A1 *  6/2006 Abedi et al. ................ 380/270

* cited by examiner

*Primary Examiner*—Jung Kim
*Assistant Examiner*—Izunna Okeke
(74) *Attorney, Agent, or Firm*—Michael J. Buchenhorner; Vazken Alexanian (57) ABSTRACT

A platform configuration measurement device including: a configuration register; means for executing extension processing in which a predetermined operation is performed on a content of the configuration register by using a given additional value, a hash value is obtained by applying a predetermined hash function to a value obtained by the predetermined operation, and the hash value is set for a new content of the configuration register; and measurement extension means for obtaining measured values, corresponding to predetermined components constituting a platform, by sequentially making predetermined measurement on the predetermined components, and for allowing the means for executing extension processing to execute the extension processing using the measured values as the additional values, random extension means is provided for allowing the means for executing extension processing to execute the extension processing using a random value as the additional value.

4 Claims, 5 Drawing Sheets

| No. | TIME | MEASURED VALUE | DESCRIPTION |
|---|---|---|---|
| 1 | ... | $m_1$ | BIOS ver. xx |
| 2 | ... | $m_2$ | OS LOADE ver.xx |
| 3 | ... | $m_3$ | OS ver. xx |
| 4 | ... | $r_1$ | RANDOM EXTENSION |
| | | | |
| ... | ... | $r_j$ | RANDOM EXTENSION |

FIG.6

RELIABILITY PLATFORM CONFIGURATION MEASUREMENT, AUTHENTICATION, ATTESTATION AND DISCLOSURE

FIELD OF THE INVENTION

The present invention relates to a platform configuration measurement device, a platform configuration authentication device, a platform configuration attestation device, a platform configuration disclosure device, and programs and methods for realizing the same to evidence reliability of the platform.

BACKGROUND OF THE INVENTION

The following documents are considered herein:

[non-patent document 1] TPM Main, Part 1 Design Principles, Specification Version 1.2, October 2003, Internet <URL: http://www.trustedcomputinggroup.org>
[non-patent document 2] TPM Main, Part 2 TPM Structures, Specification Version 1.2, October 2003, Internet <URL: http://www.trustedcomputinggroup.org>
[non-patent document 3] TPM Main, Part 3 Commands, Specification Version 1.2, October 2003, Internet<URL: http://www.trustedcomputinggroup.org>
[non-patent document 4] TCG Software Stack (TSS), Specification, Version 1.1, August 2003, Internet <URL: http://www.trustedcomputinggroup. org>
[non-patent document 5] TCG PC Specific, Implementation Specification, Version 1.1, August 2003, Internet <URL: http://www.trustedcomputinggroup.org>

The specification issued by TCG (Trusted Computing Group), which is an industry working group of a legal entity whose aim is to improve security of computers, defines a hardware component equipped with an anti-tamper capability. The hardware component can provide prevention against unauthorized readout and tampering of confidential data (non-patent documents 1 to 5). This component is a security chip referred to as Trusted Platform Module (abbreviated as TPM hereinafter) and can provide various security services relating to a computing platform. The TPM module has already been installed in a plurality of personal computers, and is becoming involved in other platforms including servers and mobile devices.

As one of the services provided by TPM module there is a service which is referred to as attestation in the TCG terminology. In this service a computer measures the configuration of hardware and software, and reports precise values of a measurement to a third party as reliable information. This information is valuable to an individual who needs to know the reliability of the platform used in a service provider.

The measurement results of the configuration by a TPM module are stored in a platform configuration register (abbreviated as PCR register hereinafter) inside of the TPM module as PCR values. With a request of attestation, the TPM module generates a digital signature of PCR values, and returns both the PCR values and the digital signature to the requester. With the return, the requester can acquire rather accurate and reliable information about attributes on the platform, with an assumption that the requester will share a certain degree of confidence in the TPM module.

There are not many PCR registers equipped in a TPM module. In the TCG specification it is specified that there should be 16 PCR registers as a minimum number. However, most of the registers have been reserved for some specifically dedicated purposes. Therefore, in order to register some new information added on the previous value, a specific process called PCR extension is adopted to renew the register in record mode for a PCR value of each PCR register. This process is indicated in the following equation.

$$\text{NewPCR}_j \text{ Value} = \text{HASH}(\text{OldPCR}_j \text{ value} \| \text{Additional Value}) \quad \text{[Equation 1]}$$

Here, the suffix "j" is an index identifying each PCR register. In other words, when each register is extended with a new additional value, the new PCR value is a cryptographic hash value of concatenation of the Old PCR value and an additional value. During a boot sequence the platform continuously executes extension operations for each register using a hash value of the software component executed sequentially as an additional value. All through this time period, the platform records the log information about extension operations.

However, the detailed information on configuration which is registered in the PCR registers as described hereinbefore is very much useful for attackers. Using the information, the attackers know immediately what kind of attack tools would be useful for the platform and what would be the time when the platform altered the configuration.

SUMMARY OF THE INVENTION

There is a need for technologies which facilitate authentication of a reliable platform, overcoming the problems in the conventional technologies and without giving away any information to possible attackers of the platform.

According to an embodiment of the invention, a platform configuration measurement device includes registers storing content; means for executing extension processing in which a predetermined operation is performed on a content of the register by using a given additional value, a hash value is obtained by applying a predetermined hash function to a value obtained by the predetermined operation, and the hash value is set for a new content of the register; and measurement extension means for obtaining measured values, corresponding to predetermined components constituting a platform, by sequentially making predetermined measurement on the predetermined components, and for allowing the means for executing extension processing to execute the extension processing using the measured values as the additional values. The platform configuration measurement device includes: random extension means for allowing the means for executing extension processing to execute the extension processing using a random value as the additional value.

Moreover, a method for measuring a platform configuration according to the present invention includes the steps of: by extension processing means, executing extension processing in which a predetermined operation is performed on a content of a register by using a given additional value; a hash value is obtained by applying a predetermined hash function to a value obtained by the predetermined operation; and the hash value is set for a new content of the register; and by measurement extension means, obtaining measured values, corresponding to predetermined components constituting a platform, by sequentially making predetermined measurement on the predetermined components, and executing the extension processing steps using the measured values as the additional values. The method includes the step of: by random extension means, executing the extension processing through the executing extension processing step using a random value as the additional value.

Moreover, a platform configuration measurement program according to the present invention causes a computer to operate functioning as means for constituting the platform configuration measurement device, or causes a computer to execute each step for constituting a platform configuration measurement method.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The present invention provides technologies which facilitate authentication of a reliable platform, in regards of the problems in the conventional technologies and without giving any information for an attack to the attackers. To attain this object, a platform configuration measurement device according to the present invention includes registers; means for executing extension processing in which a predetermined operation is performed on a content of the register by using a given additional value, a hash value is obtained by applying a predetermined hash function to a value obtained by the predetermined operation, and the hash value is set for a new content of the register; and measurement extension means for obtaining measured values, corresponding to predetermined components constituting a platform, by sequentially making predetermined measurement on the predetermined components, and for allowing the means for executing extension processing to execute the extension processing using the measured values as the additional values. The platform configuration measurement device includes: random extension means for allowing the means for executing extension processing to execute the extension processing using a random value as the additional value.

The present invention also provides a method for measuring a platform configuration which includes the steps of: by extension processing means, executing extension processing in which a predetermined operation is performed on a content of a register by using a given additional value; a hash value is obtained by applying a predetermined hash function to a value obtained by the predetermined operation; and the hash value is set for a new content of the register; and by measurement extension means, obtaining measured values, corresponding to predetermined components constituting a platform, by sequentially making predetermined measurement on the predetermined components, and executing the extension processing steps using the measured values as the additional values. Particular embodiments of the method include the step of: by random extension means, executing the extension processing through the executing extension processing step using a random value as the additional value.

The present invention also provides a platform configuration measurement program for causing a computer to operate functioning as means for constituting the platform configuration measurement device, or causes a computer to execute each step for constituting a platform configuration measurement method.

Here, as a platform, hardware and software constituting a computer system, for example, is considered to be corresponding. As configuration registers, PCR registers specified in the TCG specification, for example, are considered to be corresponding. As a predetermined operation, an operation to concatenate an additional value to the content of a configuration register, for example, is considered to be corresponding. As a Hash function, SHA-1 (Secure Hash Algorithm 1), for example, is considered to be corresponding. As predetermined configuration components, various sorts of software components and hardware components, for example, are considered to be corresponding. As a predetermined measurement: to acquire a hash value of a software component; to acquire a product name and version number stored in a register of hardware component and to acquire a hash value thereof; and to acquire hash values of micro-code and firmware installed in the hardware, for example, are considered to correspond.

In this configuration, a series of measurements are made to each component constituting the platform. While the extension processing using measured values as additional values is sequentially performed, in each extension processing and for each content of a configuration register, a predetermined operation is conducted using an additional value. The hash value for the value thus obtained becomes a new content of the configuration register. When the extension processing will have finished on the basis of measurements of each configuration component, the values of configuration registers will become values reflecting precisely the measured values of each configuration component. Therefore, in a case that configuration values would be known by an attacker, there may be a serious concern involved that the attacker may easily acquire information to make an attack on the platform.

To dissolve the concern, the present invention facilitates random extension means. Therefore, in addition to the extension processing on the basis of measurement values it is possible to execute extension processing using random values as additional values. As a result of this extension processing with a random value, a value of the configuration register will have no meaning at all unless having the used random values. Therefore, after extension processing using a random value is once applied, an attacker will not be able to obtain useful information even if configuration register values are known by the attacker. On the other hand, it is made possible for a proper right holder to acquire information on each configuration component of the platform, by providing the used random values in addition to values of the configuration registers, and further by providing a log storing values of the configuration registers before the extension processing using the random values and a history including information on an additional value in each extension processing.

In an advantageous embodiment of the present invention, extension processing using a random value as an additional value is executed repeatedly at a predetermined timing or at random. Moreover, a series of extension processing in sequential measurements is executed at the bootstrap time in the main platform. Thereafter, the extension processing using a value as an additional value is executed. At each extension processing, generated is a log which includes a content of each extension processing, such as time at the executing processing, a subject of the measurement, an additional value, with an extension using a random value or without, and the like. A PCR register and extension processing specified in the TCG specification can be applied for a configuration register and extension processing using a measured value, respectively.

Further, a platform configuration authentication device, method and program according to the present invention characterized in including: by sending means, sending a third party a content of the register of the platform configuration measurement device together with a log storing records of extension processes executed in the device, the content of the register and the log being digitally signed, in response to an authentication request including a nonce from a client; by receiving means, receiving digitally signed credential sent from the third party in response to the sending action, the credential vouching for trustworthiness of a platform configuration according to the content of the register to be appended; and by sending means, sending the client the received credential together with the digitally signed nonce and content of the register. According to this, it is possible to show reliability of the platform configuration to a client without providing specific information on the configuration.

A platform configuration attestation device, method and program according to the present invention characterized in including: by receiving means, receiving a content of a register and a log sent from the platform configuration authentication device; by checking means, checking trustworthiness of a platform configuration according to the content of the register, based on the received content of the register and the received log; and by sending means, sending the platform configuration authentication device a digitally signed credential which vouches for the trustworthiness of the platform configuration according to the content of the register to be appended to the credential. The checking means can execute the checking on the basis of whether platform configuration stored in the log is reliable or not, and further whether a register value obtained by reproduction of each extension processing stored in the log is equal to the register value or not.

Further, a platform configuration disclosure device, method, and program according to the present invention is characterized in including: by sending means, sending a requester a content of the register of the device, in response to a request; and by sending means, sending the requester a log storing records of extension processes executed in the device, with addition of a restriction depending on an attribute of the requester. As shown hereinbefore, by controlling an access to the log depending on the requester, it is possible to impose restriction for the known requester who wants to use a web service in the platform to allow to look into that part of log which is relevant to the web service, for example. Moreover, it is possible to refuse any sorts of access to the log by an unknown requester. On the other hand, in the case of configuration checking by the platform itself it is possible for the platform to access the configuration without any restriction. Therefore, without any limit to access the configuration can be checked.

According to the present invention, it is possible to make meaningless the contents of a configuration register alone. That is, the contents of the configuration register can be made meaningful only with the aid of a log. Accordingly, it is possible to control the provision of information about a platform configuration by controlling the access to the log.

Figure 1:
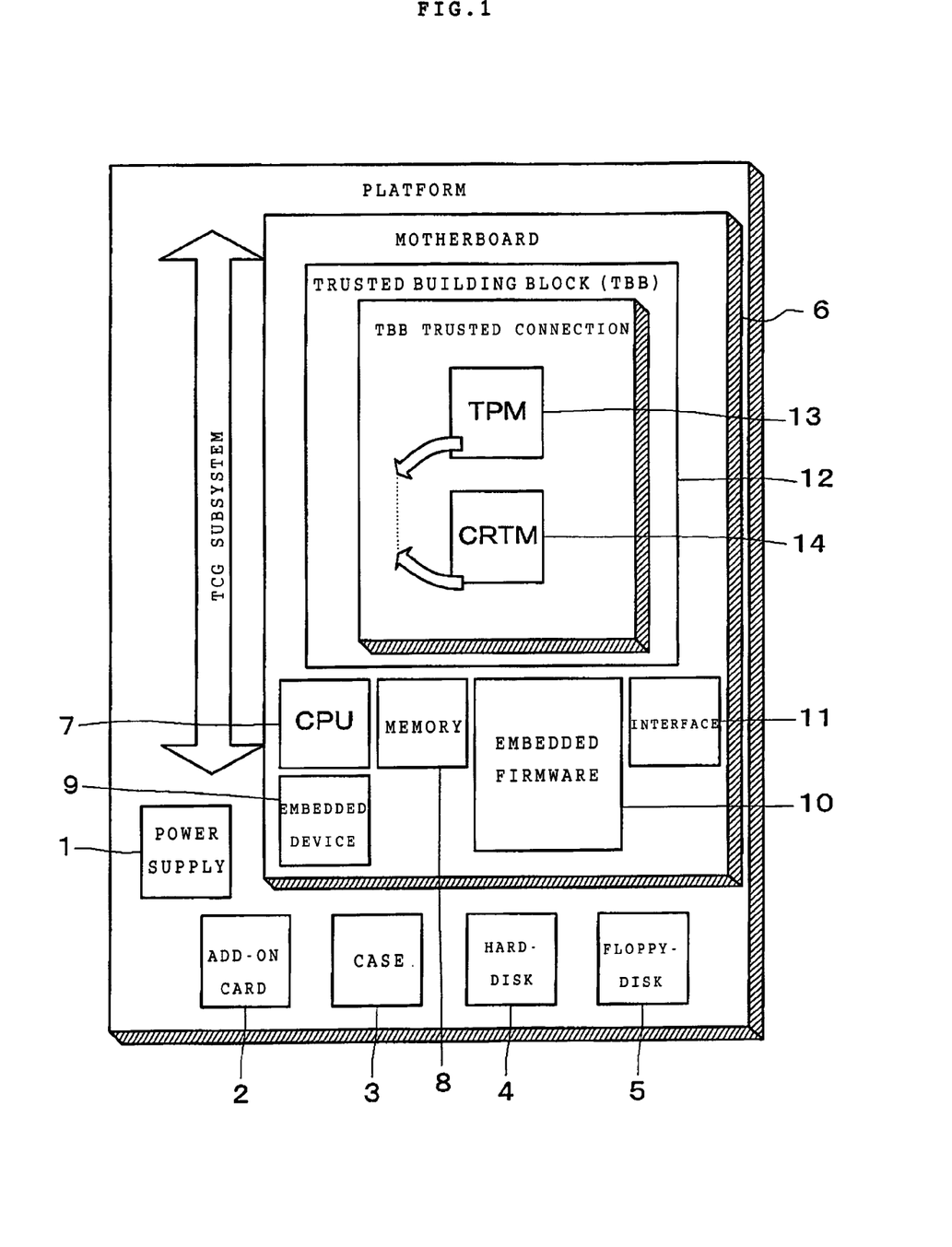
FIG. 1 is a block diagram showing a configuration of platform according to an embodiment of the present invention.

FIG. 1 shows a configuration according to an embodiment of the present invention. The platform, as shown in the figure, includes a power supply 1, various add-on cards 2, a case 3, a hard disk 4, a floppy disk 5 and a motherboard 6. The mother board 6 includes a CPU 7, a memory 8, various embedded cards 9, POST (Power On Self Test) BIOS, a platform extension and other embedded firmware 10, interfaces 11 such as IDE, PS/2, USB, and trusted building block 12 which is a reliable structural section.

The trusted building block 12 includes a TPM module and CPTM (Core Root of Trusted for Measurement) 14 defined in the TCG specification. The TPM module 13 is a security chip which provides basic functions for assurance of security and protection of privacy. Inside of the chip, PCR registers storing measurement results relating to each configuration component configuring the platform are included, besides a processor facilitating the functions and the like. The CRTM 14 is an executable component which gains control of the platform, when the platform is initialized by reset.

Figure 2:
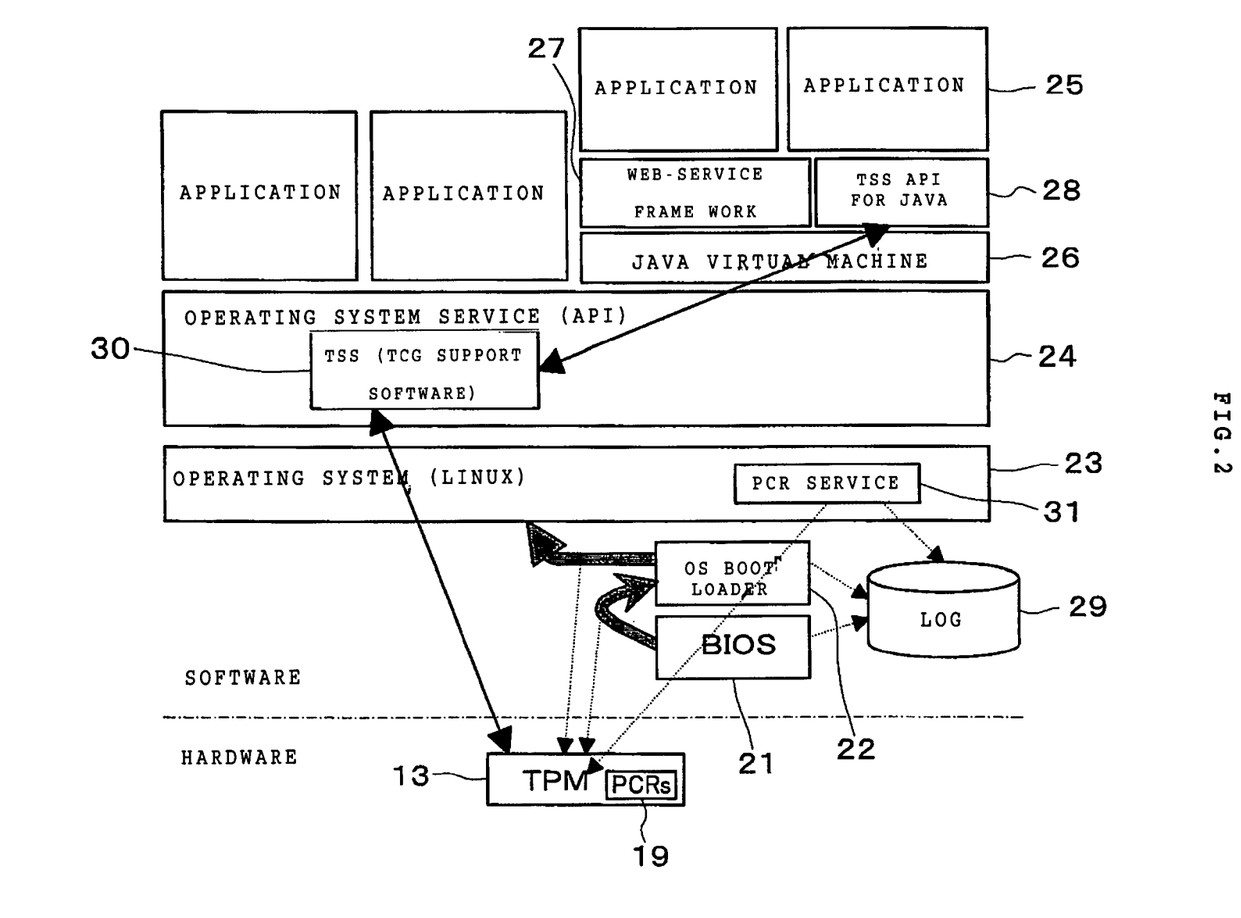
FIG. 2 is a hierarchical diagram of software in the platform shown in FIG. 1.

FIG. 2 shows a constitution of software in the platform in hierarchical layers. The constitution includes various applications 25, a BIOS 21 which provides access functions and the like for applications 25 and also between devices each other, an OS 23 equipped with basic control functions, a boot loader 22 which boots up the system by loading the OS 23, and operating system services 24 providing interfaces and the like between the OS 23 and the applications 25. The operating system services 24 include a TSS (TCG Support Software) 30 specified in the TCG specification. The TSS 30 provides various APIs (Application Program Interface) to access the TPM 13 and a log file 29.

Java (registered trademark) virtual machine 26 runs on the operating system service 24 to execute a Java (registered trademark) application on OS 23. On the Java (registered trademark) virtual machine 26 a web service framework 27 and TSS-API (Application Program Interface) 28 for Java (registered trademark) run. The TSS-API 28 provides similar functions as TSS 30 for Java (registered trademark) applications. Take for example, it is possible to write an application program for on-line book sales in Java (registered trademark) and to install the application as a web service.

The OS 23 is equipped with a PCR service 31 which is a demon process on unix. The PCR service has a function to cause PCR values in PCR register 19 provided in the TPM 13 to be obfuscatory.

In the boot sequence of this constitution, measurements are made for the binary image of BIOS 21, the OS boot loader 22, and the OS 23, for example. Here, the measurements mean to obtain a hash value for the subjects on measurement, or further to record a content of log and to execute extension processing to the corresponding PCR register 19. That is to say, each PCR register 19 in TPM 13 is extended using a hash value, and the data regarding to the extension processing is stored inside the log file 29.

The boot sequence terminates and subsequently when the system constituting the platform starts to run, the PCR service 31 extends the PCR register 19 using a random value and stores information relating to extension processing to a log file 29. With this processing, even if a content within the PCR register 19 under the ordinary authentication process has been leaked to the third party it is not likely to happen for the third party to know the valid PCR values before the application of extension processing using random values.

Figure 3:
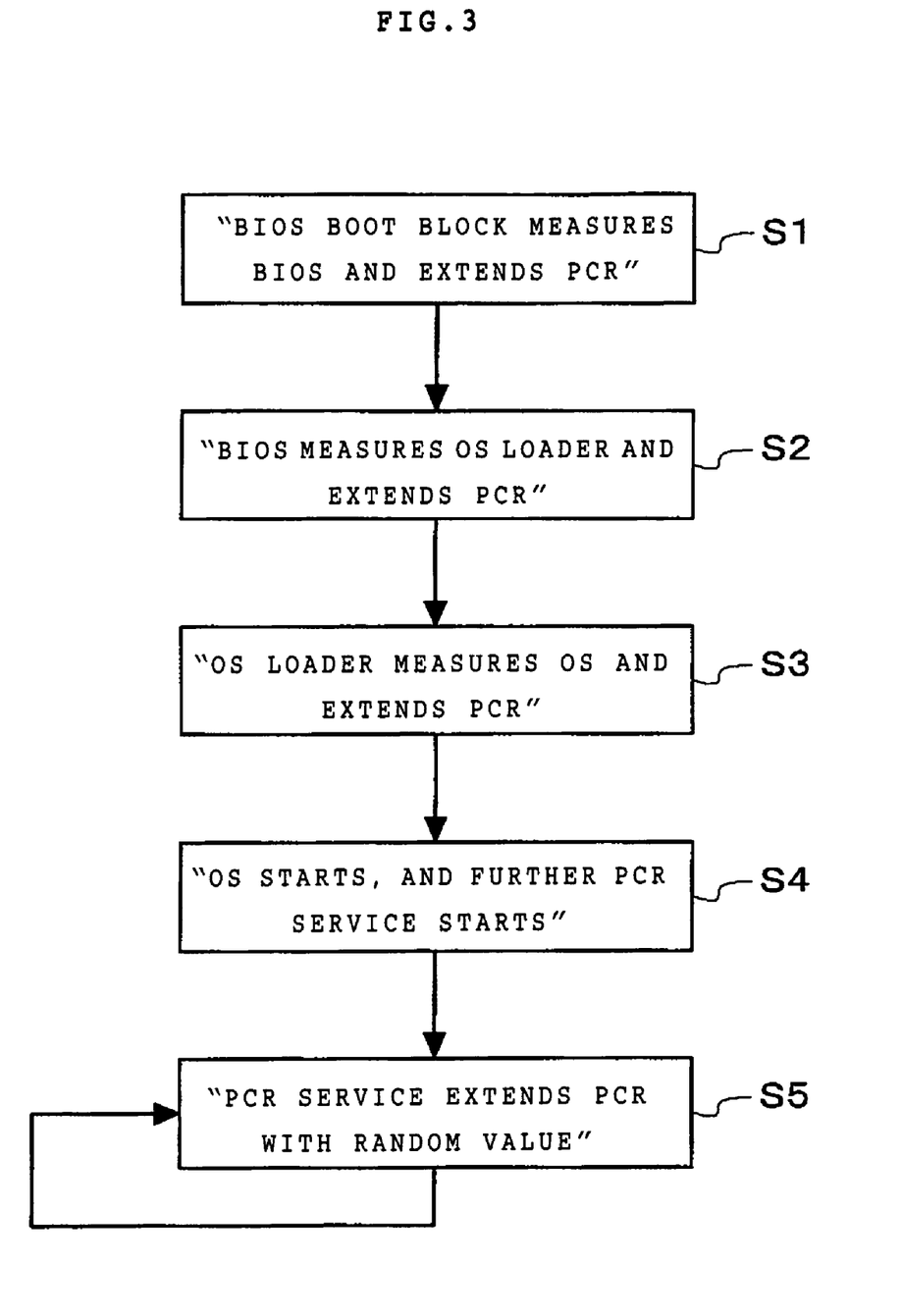
FIG. 3 is a flowchart showing steps of the extension processing of a PCR register in the platform shown in FIG. 1.
Figure 4:
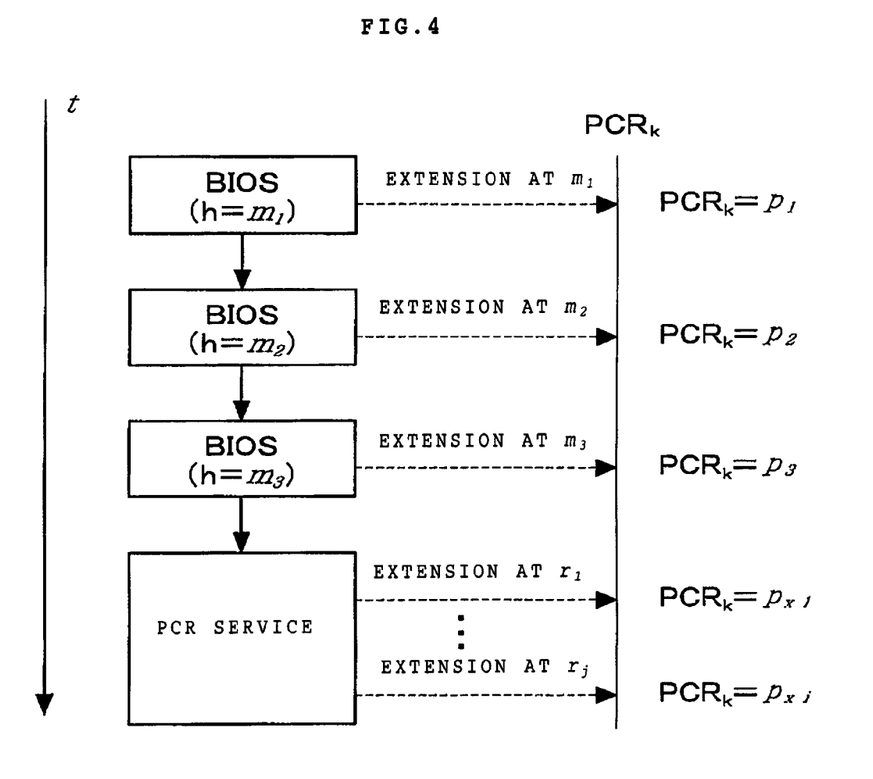
FIG. 4 is a chart showing a sequence of up-dating of PCR values in the steps shown in FIG. 3.
Figure 5:
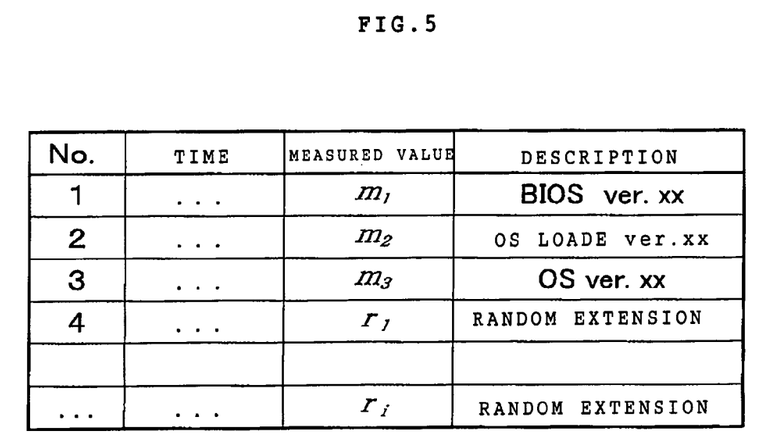
FIG. 5 is a table showing a content of a log acquired in the steps in FIG. 3.

FIG. 3 shows steps of the extension processing for a PCR register 19. FIG. 4 shows each state of updating a PCR value in the steps. FIG. 5 shows a content of the log recorded in the steps. It is to be noted that, here in this case, a rather simplified example is shown compared to an actual system. In the boot sequence if the hash value of a component in the i-th measurement is set $m_i$, the up-dated PCR value after the i-th extension can be given as the equation below. Here, as a Hash function SHA-1, for example, can be adopted.

$$p_i = \text{HASH}(p_{i-1} \| m_1) \quad \text{[Equation 2]}$$

Given that, i>0, $p_0$=0

In other words, once the boot sequence starts, first of all, at Step S1 the boot block in BIOS 21 measures the BIOS 21 and executes extension processing for the k-th PCR register ($PCR_k$) as its target. Here, the initial values of the PCR registers are zero. As shown here in FIG. 4, assuming that a hash value h of BIOS obtained in measurement is set as $m_1$ the boot block stores in the $PCR_k$, as a new value, a hash value $p_1$, which is a concatenated value obtained by concatenating the hash value $m_1$ to zero. At the same time, the boot block records the time of processing, the measured value $m_1$, and a description to specify the measured BIOS 21 as for the first extension processing as in FIG. 5.

Thereafter, transiting to a state under the control of BIOS 21, in Step S2, the BIOS 21 measures the OS loader 22. In other words, the BIOS 21 acquires a hash value $m_2$ of the OS loader 22, and then with the value and in use of the equation 2 the BIOS 21 acquires $p_2$ and stores the value in the $PCP_k$. Moreover, the BIOS 21 records the history of extension processing the to log file 29.

Thereafter, transiting to a state under the control of OS loader 22, in Step S3, the OS loader 22 measures the OS 23. In other words, the OS loader 22 acquires a hash value $m_3$ of the OS 23, and then with the value and in use of the equation 2 the BIOS 21 acquires $P_3$ and stores the value to $PCP_k$. Moreover, OS loader 22 records the history of extension processing to the log file 29.

After the last step in the boot sequence has completed, the process transits to a state where it is under the control of OS 23. Then in Step S4, the OS 23 starts control thereof. Moreover, at the same time, the PCR service 31 starts the operation thereof.

Next, in Step S5, the PCR service 31 acquires a random value $r_1$, and, then using the value, executes extension processing for PCR registers ($PCR_k$) and stores the history thereof to the log file 29. Thereafter, the PR service 31 repeatedly executes processing in Step S5 by using a random value $r_1$ while the system is running.

Here, the PCR value is $P_3$ when the boot sequence is completed. This value has still some meaningful information for an attacker. However, a PCR value $P_{x1}$ which is extended using a random value $r_1$ and is caused to be obfuscatory does not have any meaning unless it is supplemented by a log shown in FIG. 5. An authorized right holder, such as a reliable third party shown in FIG. 6 to be described hereinafter, can authenticate safety of each component on the basis of the stored history in the log, and at the same time, can also authenticate that the PCR value $P_{x1}$ is a result of extension using the random value $r_1$.

Figure 6:
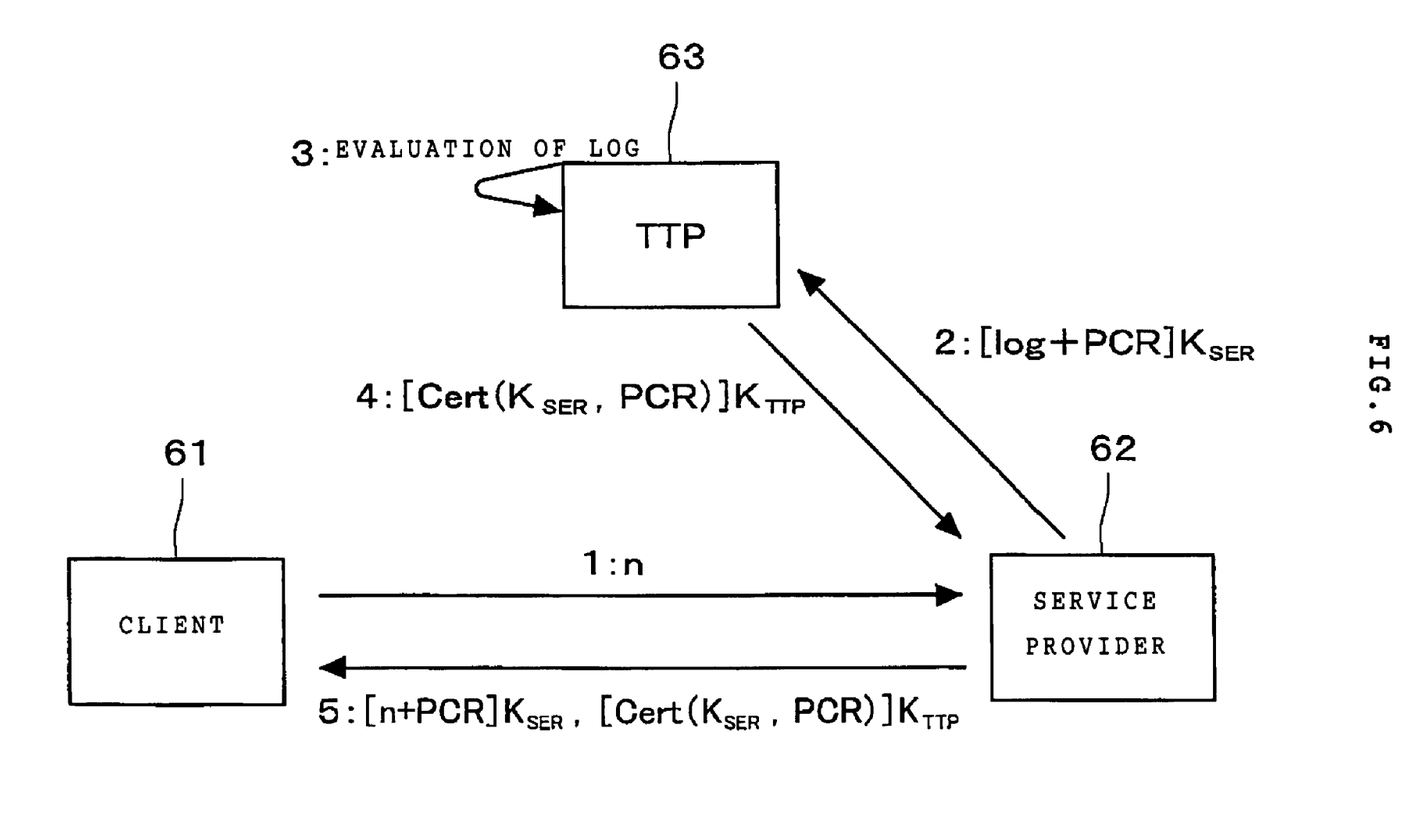
FIG. 6 is a chart showing an authentication method of the platform in FIG. 1 using obfuscated PCR values but not accessing a content of the log.

In FIG. 6, it is shown that a client can authenticate reliability of the platform shown in FIG. 1 held by an on-line service provider without accessing a log and by using only an obfuscated PCR value $P_{x1}$. First, the client 61 transmits a nonce$_n$ to the platform of service provider 62 and requests for authentication. In response to this, the platform of the service provider 62 transmits the log 29 and PCR values digitally signed with a key $K_{ser}$ to an attestation device at a trusted third party 63 (TTP: Trusted Third Party). It is to be noted that this attestation device can be configured with a similar platform shown in FIG. 1.

The attestation device in the third party 63 evaluates the log and PCR values, and authenticates the following conditions: (1) reliability of the configuration of the platform indicated by the log, and (2) agreement of PCR values with the values estimated from the log. When an authentication is achieved, the attestation device in the third party 63 issues a credential warranty digitally signed using digital key $K_{ser}$, the credential warranty giving credential to a digital key $K_{ser}$ and PCR values. The platform of service provider 62 transmits to the client 61 the issued credential warranty with the nonce and the concatenated PCR values digitally signed using digital key $K_{ser}$. The client 61 can recognize based on the received credential warranty that the platform of the service provider 62 is reliable. The PCR values are obfuscated. Therefore, the client 61 will not be able to obtain any knowledge on the configuration of the platform.

In accordance with this approach, when an on-line service is requested, it is possible, on one hand, to give credential warranty on the configuration of the platform to proper right holders. On the other hand, to other individuals who do not have a proper right it is possible to leave the configuration obfuscatory. For example, let us assume that a service provider 62 in FIG. 6 is an on-line book seller and a client 61 is a customer. The customer, prior to sending the credit card number, can authenticate the points as follows: (1) The on-line book seller is what it is asserting itself and nothing else. (2) The service to be provided is running on the computer platform with the configuration known to be reliable. Having those two points above, it is possible for the client to assure a much higher confidence so that the credit card number will not be stolen from a server in the on-line book seller. At this point of time, the on-line book seller can give permission for a client with a proper right to investigate the software constitution of the platform by providing the log 29. On the contrary, for those who are not known well, the on-line book seller can keep the log 29 behind so that the log will not be provided. In other words, the on-line book seller can prevent the PCR values from being deciphered by individuals who do not have any proper right though the PCR values themselves can be seen by any clients.

Moreover, there is a tendency that a platform of a server runs continuously for a long period of time without a re-boot. Under the given condition, there may be a concern that an attacker can identify whether the configuration of the platform has been altered or not by simply comparing PCR values between two different points of time. PCR values can be acquired at any points of time by using authentication mechanism shown in FIG. 6. Given this as a condition, and further in case when a vulnerability has been found in the software component and no up-date has been applied after a release of a security patch at the time of authentication of PCR values, it is likely to cause a problem. The fact that no alternation has been applied to the platform means that the vulnerability has not been mended. More specifically if the vulnerability is a serious weak point in the commonly used software component, the attacker may try to attack deliberately a server in which no up-date in the configuration has been applied. Thus the attacker can increase the rate of success by aiming at the vulnerability on an attack. Here, the attacker needs not even to know the meaning of the PCR values. By just comparing PCR values obtained at different points of time, it is possible for the attacker to attack the platform.

However, in accordance with the present embodiment, in the step S5 of FIG. 3, an attack such as this will be prevented since the embodiment is executing extension of PCR values using random values at random time intervals. While a series of extension processing using random values $r_i$ is recorded in the log as shown in FIG. 5, it is possible to provide the log to a proper individual asking for authentication. Therefore, the proper individual asking for authentication can authenticates that the last PCR values are results of a series of repetitive extension processing using a random value $r_i$ for the i-th extension.

In the mean time, it is preferable to transmit a content of log 29, in which each extension processing is recorded, with some additional restrictions on the log content depending on attributes of a requester, when transmitting a content of the PCR register to the requester. That is, if there is a sufficient number of PCR registers available, it is possible to provide only a minimum amount of information which may suit for the purpose of the requesters who use the platform for the various kinds of objectives.

For example, let us assume that a first user wants merely to use a web server of the platform and a second user is merely interested in using an application server. In this case, the first user does not need to know the service availability of the application server in the platform, and the second user does not need to recognize the availability of the web server.

Now, a following condition is assumed, that is: the 6-th PCR register, PCR6 holds the information on boot and configuration of kernel; the PCR7 holds the information on web server and measured values related to the configuration file; and PCR8 holds the information on measured values of the application server. First, the first user accesses the platform and joins to an authentication process following the two-way authentication protocol. Next, the platform gives the ordinary authentication information as shown in FIG. 6. In this instance, the platform generates and transmits a special event log which includes the information only related to PCR6 and PCR7 on the basis of log 29. On this occasion, the first user can refer to the current PCR8 but there is no way for the first user to understand the value. Neither there is any needs to do so.

It is to be understood that the present invention is not intended to be limited to the above-described embodiment but may be embodied in other forms. For instance, hereinbefore in a case of measuring a configuration of platform, hash values of software components are acquired. However, it need not be limited as above, but it is also plausible to acquire a product name recorded in a register of hardware component and a version number, or hash values thereof. Moreover, it is also plausible to acquire hash values of microcode included in the software or firmware. The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention. Methods of this invention may be implemented by an apparatus which provides the functions carrying out the steps of the methods. Apparatus and/or systems of this invention maybe implemented by a method that includes steps to produce the functions of the apparatus and/or systems.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A platform configuration measurement device comprising:
    a platform configuration register (PCR register) specified in the Trusted Computing Group specification, the PCR register storing content relating to configuration information of a computing platform;
    at least one processor configured:
    for executing extension processing in which a predetermined operation of concatenation of an additional value to the content of the PCR register is performed on the content of the register by using a given random value, wherein a hash value is obtained by applying a predetermined hash function to the given random value obtained by the predetermined operation, and the hash value is set for a new content of the PRC register;
    for obtaining measured values, corresponding to predetermined components constituting a platform, by sequentially making a measurement on the predetermined components, and executing the extension processing using the measured values as the additional values;

for performing random extension for executing the extension processing repeatedly at a predetermined timing using the given random value as the additional value;

for sending a third party the content of the PRC register together with a log storing records of extension processes executed in the device, the content of the register and the log being digitally signed, in response to an authentication request including a nonce from a client;

for receiving a digitally signed credential sent from the third party in response to the sending action, the credential vouching for trustworthiness of a platform configuration according to the content of the register to be appended; and for sending the client the received digitally signed credential with the digitally signed nonce and content of the register; and a platform configuration measurement program causing the computer platform to operate functioning for constituting the platform configuration measurement device.

2. The platform configuration measurement device of claim 1, wherein following the extension processing using the measured value as an additional value, extension processing is executed using the random value as an additional value.

3. The platform configuration measurement device of claim 1, wherein the processor includes a log to store a history of each extension processing.

4. The platform configuration measurement device of claim 1, wherein the register and the extension processing using measured value are a PCR register and extension processing specified in the TCG specification respectively.

* * * * *